Oct. 18, 1966
O. BUSSE
3,279,603
SEWAGE DISPOSAL INVOLVING FILTRATION OF THE SEWAGE
Filed Nov. 2, 1964
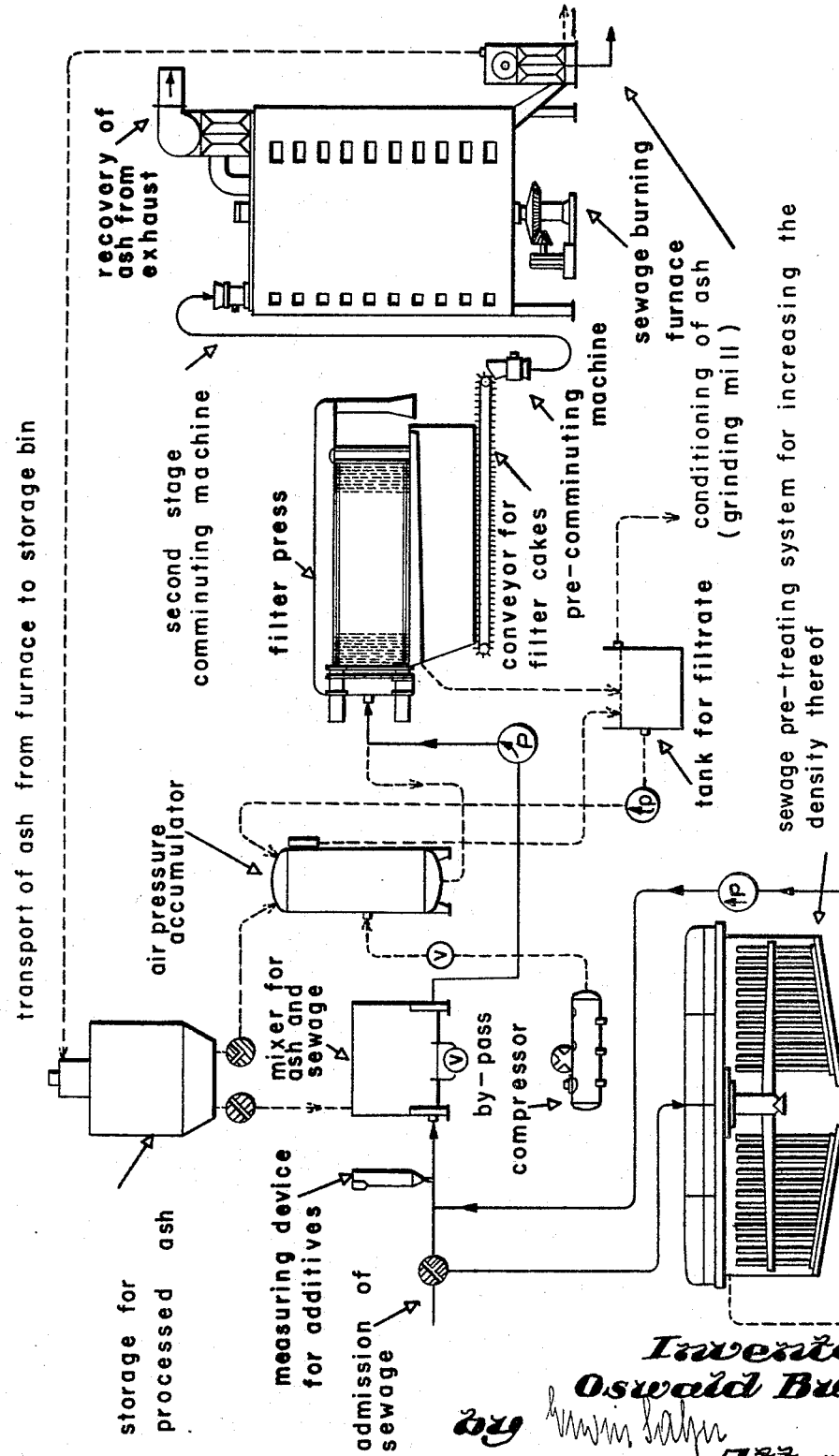
Inventor:
Oswald Busse,
by [signature]
Attorney

3,279,603
SEWAGE DISPOSAL INVOLVING FILTRATION OF THE SEWAGE
Oswald Busse, Karlsbader Str. 16, Michelbach, Germany
Filed Nov. 2, 1964, Ser. No. 410,345
4 Claims. (Cl. 210—67)

This is a continuation of my copending patent application Ser. No. 187,458, filed on Apr. 11, 1962, for sewage disposal involving filtration of the sewage, now abandoned.

This invention is concerned with the disposal of sewage, and more particularly with disposal of sewage by burning of sewage upon removal of a substantial portion of the initial content of liquid thereof. The removal of a substantial portion of the initial content of liquid of sewage is preferably achieved by means of large filtering machines which may resort to a vacuum, if desired, for increasing the filtering action thereof. A filtering machine particularly suitable for filtering sewage is disclosed in the copending patent application of Harald J. G. Schade filed Aug. 14, 1961, Ser. No. 132,276 for Machines for Filtering Large Quantities of Water and Other Liquids, now U.S. Patent 3,221,887, issued Dec. 7, 1965, assigned to the same assignee as the present invention.

The problem of filtering sewage is rendered particularly difficult on account of the fact that sewage generally includes certain substances which tend to clog the filters used in the process of filtering sewage. To prevent clogging of filters it is necessary, or desirable, to apply certain substances referred to as filtering media, or filter aids, which, if added to sewage, convert the latter from its original filter-clogging form into a more readily filterable form. There are numerous substances or additives to sewage which may be used as filtering media or filter aids, or for reducing the resistance to the flow of sewage through sewage straining filters. Hydroxides of iron as well as certain salts of aluminum as well as ashes resulting from combustion of organic substances lend themselves well for use as filtering media, or filter aids, for the treatment of sewage. Since the use of chemicals as filtering media, or filter aids, is rather expensive, and since the use of ash for that purpose is relatively inexpensive, and since such ash is formed as a by-product of the disposal of filtered or semi-dried sewage by combustion, the use of ash as a filtering medium is generally preferable to that of any other filtering media, or filter aids, for sewage.

It is one object of this invention to provide improved processes for disposing of sewage including the steps of applying ash as a filtering medium, or filter aids, for sewage, subsequent filtration of sewage and subsequent burning thereof.

The present invention is predicated upon an investigation of the part played by ash added or admixed to sewage in making sewage filterable, or more readily filterable.

It has been found that there is an optimal quantity of ash of a given kind for any particular kind of sewage which quantity should never be exceeded. If this critical quantity of ash as an additive to sewage to be filtered is exceeded, the effectiveness of the process of filtration will increase in proportion to the ash content of the sewage, but the content of liquid of the cakes resulting from filtration of the sewage will likewise increase. Hence there is no point in exceeding the aforementioned critical or optimal quantity of ash applied as a filtering medium, or as an additive, to sewage to be filtered.

It has, however, been found that the average size of the particles of ash which is used as a filtering medium, or as a filtering agent, as well as the specific gravity of the ash used for that purpose, is a crucial factor controlling the relative effectiveness of the aforementioned use of ash.

It is, therefore, another object of this invention to apply ash of such particle sizes and of such specific gravity to sewage to be filtered as to achieve a particularly high, or an optimal, conversion of the untreated sewage into a readily filterable form.

The surfaces of the particles of ash used as a filtering medium, or as a filtering agent, exert an adsorptive action upon the particles of solid organic matter contained in sewage. The smaller the particle size of a given quantity of ash, the larger the aggregate surface of all particles included in that quantity of ash, the larger the adsorptive action of the given quantity of ash. Hence it is desirable to apply ash having a relatively small average particle size as a filtering medium, or as a filtering agent, for increasing the filterability of sewage. Such ash has an average particle size of less than 0.1 millimeter. This grain size is critical. The filter resistance increases at first slowly, if ash with an average particle size of 0.2 millimeter is used, and then more rapidly if ash with an average particle size of more than 0.3 millimeter is used. If the particle size is decreased below 0.1 millimeter the filter resistance does not significantly decrease, so that a sufficient low filter resistance is obtained by using an ash having an average particle size of less than 0.1 millimeter. If ash is strained through a sieve through which only particles having a particle size less than 0.2 millimeter are allowed to pass, then ash is obtained containing 80–85% particles having a particle size less than 0.1 millimeter, and such ash may be applied as filtering medium or filtering agent. Preferably the average size of particles of ash used as a filtering medium for sewage should be less than 0.06 millimeter. Then substantially all particles of the ash will have a grain size of less than 0.1 millimeter. Such an ash, however, can more readily be obtained by separation by means of a sieve than a pulverulent substance made up of particles all having substantially an equal grain size of slightly less than 0.1 millimeter.

The aggregate surface of particles of a given size forming a given quantity of ash is inversely proportional to the specific gravity of the particular kind of ash. Since the adsorptive action of ash is proportional to the surface of the particles involved and since under the above conditions surface and specific gravity are inversely proportional, ash having a relatively small specific gravity tends to achieve a particularly high, or an optimal, conversion of sewage into a more readily filterable form if used as an additive to sewage to promote the filterability thereof.

When burning sewage in a sewage burning furnace the ash forming the residue of such combustion may be collected under the grate of the sewage burning furnace. The effectiveness of the ash in the condition in which it is recovered from under the grate of a sewage burning system as a medium for improving the filterability of sewage is, however, relatively limited. This is due to the fact that the average particle size as well as the specific gravity of such ash are relatively large. However, ash taken from under the grate of a sewage burning furnace can be made into a highly effective filtering medium for sewage if the temperature in the furnace is kept below 1000° C., and particularly in the range of 800–1000° C., so that melting of the ash under formation slag, and particularly that of vitreous slag, resulting in an increase of the specific gravity of the ash, is avoided. Ash resulting from such low temperature combustion is comminuted in a grinding mill, a breaker, or any other means suitable for this purpose, to an average grain size of less than 0.1 millimeter, or preferably to an even smaller average grain size say, of the order of several hundreds of a millimeter. As an alternative, the ash taken from under the grate of a sewage burning furnace may be strained through a sieve, or treated in an air separator, thereby selecting a group of ash particles of an average grain size of less than 0.1 millimeter and this group may then be applied as a filtering medium, or filtering agent, for pre-treating sewage to be filtered. Ash comminuted as above described may also be separated into ranges of particle sizes.

The flaky ash which may be collected in the exhaust system of a sewage burning furnace has a smaller average particle size than that which drops through the grate of the furnace and the specific gravity of the former tends to be considerably less than the specific gravity of the latter. Such ash, especially if the temperature in the furnace does not exceed 800°–1000° C., has a high porosity. Formation of vitreous slag increasing the specific gravity as well as the particle size, and decreasing the porosity as well as the surface of the particles is avoided when recovering ash in the form of flaky ash or fly ash from a furnace system. Hence the ash which may be recovered from the exhaust system of a sewage burning furnace is particularly well suited to be used as a filtering medium for converting sewage into a readily filterable form. Normally the grain size in such as ash will be less than 0.1 millimeter. It will thus be apparent that such an ash which has been recovered from the exhaust system of a sewage burning furnace does not require any additional processing prior to the use thereof as a filtering medium for sewage.

If the grain size of a flaky ash collected in the exhaust system of a sewage burning furnace is not small enough, the ash may be comminuted by treating it in a grinding mill, a breaker, or any other means suitable for this purpose. After this treatment it may be strained through a sieve or treated in an air separator so that ash with an average grain size less than 0.1 millimeter is obtained. But if the grain size of a flaky ash is not small enough, it is normally sufficient to strain the ash through a sieve or to treat it in an air separator. Best results will be obtained if the ash is initially separated by air and thereafter the fraction containing the particles having the smaller average grain size is strained through a sieve. Thus ash may be obtained in which essentially all particles have a grain size of less than 0.1 millimeter.

Air separation as above mentioned may be carried out in a cyclon separator as will be described below more in detail, recovering ash from hot gases of combustion and, in addition, thereto, separating a group, or fraction, of ash particles of relatively small grain size, particularly having an average grain size of less than 0.1 millimeter, from a group, or fraction, having a larger grain size. The first group, or fraction may then be strained through a sieve to obtain a fraction containing substantially particles of a grain size of less than 0.1 millimeter which may then be applied as a filtering medium, or filtering agent for pretreating sewage to be filtered.

If desired, additional cyclon separators may be used to separate the groups, or fractions, of ash of different grain size of ash which was initially recovered from the combustion gases by any appropriate means, such as, for instance, another cyclon separator.

It is also possible to provide electrofilters or filters in the form of collecting bags for recovering ash and these means may be arranged in such a way that particles can initially be removed which have too large a grain size, and, thereafter, by means of an additional filter the group of particles may be recovered which has the desired grain size of less than 0.1 millimeter to be ultimately applied as a filtering medium, or filtering agent.

Sewage may be burned in a sewage burning furnace of any desired type in the presence of an excess of air, and the ash carried away with the hot gases of combustion may be recovered by means of a cyclon separator, by means of an electrofilter predicated upon the application of static electricity, or by means of a liquid spray separator. In the latter instance the ash is recovered in a moist state, but that does not reduce its usefulness as a filtering medium since ash may be admixed in a moist state to sewage without impairing the effectiveness of the former as a filtering medium for the sewage.

A good filter medium for sewage may also be obtained by filtration of the exhaust system of a sewage burning furnace. Such filtration may be readily performed by means of filters in form of ash collecting bags arranged in the stream of exhaust gases at a point where the temperature thereof is not too high for positioning such filters. Ash which has been recovered in such a fashion has a desirable range of small grain sizes, and a relatively small specific gravity.

The ash collected from a sewage burning furnace is admixed to the sewage still having a relatively high content of liquid and intended to be filtered in order to separate the organic solid ingredients of the sewage from the aqueous phase thereof. The solid ingredients of the sewage are burned after filtration thereof which generally requires the addition of some auxiliary fuel to help combustion as, for instance, the addition of fuel oil. Since the ash used as a filtering medium is always returned to the furnace in which the organic solid ingredients of the sewage are burned, the ash is never lost but can always be recovered to a relatively large extent. The recovery of ash from the exhaust gases of a sewage burning system results in a high degree of freedom from dust of the exhaust gases as they are released from the chimney of a sewage burning plant.

The drawing illustrates diagrammatically a sewage disposal system including means for recovering ash to be used as a filtering medium for the sewage. All elements of the system illustrated in the drawing being labelled, the drawing is self-explanatory.

While I have described what at present are considered to be the preferred ways of carrying the invention into effect, it will be understood that the invention is not limited to the specific ways of carrying it into effect which have been disclosed. It will be understood that various changes and modifications can be made without departing from the spirit and scope of the invention as defined in the following claims.

I claim as my invention:

1. A process of disposing of sewage comprising in combination the steps of
    (a) burning the sewage upon removal of a substantial portion of the initial content of liquid thereof;
    (b) filtering said sewage preparatory to burning thereof to remove said substantial portion of said initial liquid content; and
    (c) applying ash having an average particle size of less than 0.1 millimeter as a filter medium preparatory to filtering said sewage to convert said sewage into a more readily filterable form.

2. A process of disposing of sewage comprising in combination the steps of
    (a) filtering sewage having a relatively large content of liquid to reduce the content of liquid thereof;
    (b) applying a filtering medium when filtering said sewage to convert said sewage into a more readily filterable form;
    (c) burning said sewage upon filtration thereof in a sewage burning furnace;
    (d) collecting the ash under the grate of said furnace formed incident to burning of said sewage;
    (e) comminuting said ash to reduce the average particle size thereof to less than 0.1 millimeter; and
    (f) applying said ash upon being comminuted as a filtering medium when filtering said sewage.

3. A process of disposing of sewage comprising in combination the steps of
    (a) filtering sewage having a relatively large content of liquid to reduce the content of liquid thereof;
    (b) applying a filtering medium when filtering said sewage to convert said sewage into a more readily filterable form;
    (c) burning said sewage upon filtration thereof in a sewage burning furnace;
    (d) collecting the ash under the grate of said furnace formed incident to burning of said sewage;
    (e) straining said ash through a sieve to obtain a selected group of particles of an average particle size, less than 0.1 millimeter; and (f) applying said selected group of particles of relative smaller average particle size as a filtering medium when filtering said sewage.

4. A process of disposing of sewage comprising in combination the steps of (a) burning the sewage upon removal of a substantial portion of the initial content of liquid thereof;

(b) filtering said sewage preparatory to burning thereof to remove said substantial portion of said initial liquid content; and (c) applying ash having an average particle size of less than 0.06 millimeter as a filter medium preparatory to filtering said sewage to convert said sewage into a more readily filterable form.

References Cited by the Examiner

UNITED STATES PATENTS

| | | | |
|---|---|---|---|
| 1,892,681 | 1/1933 | Rankin | 210—152 X |
| 2,094,909 | 10/1937 | Bailey et al. | 210—152 X |
| 2,177,857 | 10/1939 | Bevan | 210—5 |
| 3,156,198 | 11/1964 | Koch | 110—7 |

REUBEN FRIEDMAN, *Primary Examiner.*

SAMIH N. ZAHARNA, *Examiner.*